United States Patent [19]

Hayashi

[11] Patent Number: 5,565,688
[45] Date of Patent: Oct. 15, 1996

[54] METHOD FOR PREPARING AN ACTIVE SUBSTANCE OF LITHIUM SECONDARY CELLS

[75] Inventor: Yasushi Hayashi, Oobu, Japan

[73] Assignee: Nippondenso Co., Ltd., Aichi, Japan

[21] Appl. No.: 308,531

[22] Filed: Sep. 21, 1994

[30] Foreign Application Priority Data

Sep. 22, 1993 [JP] Japan .................................. 5-236252
Dec. 28, 1993 [JP] Japan .................................. 5-336002

[51] Int. Cl.$^6$ .................................................. H01M 4/88
[52] U.S. Cl. ...................... 252/182.1; 252/518; 429/218; 429/220; 429/224; 423/599; 423/604; 423/642
[58] Field of Search ...................... 29/623.1; 252/182.1, 252/518; 429/218, 220, 224; 423/599, 604, 642

[56] References Cited

U.S. PATENT DOCUMENTS 5,378,560  1/1995  Tomiyama .............................. 429/217

FOREIGN PATENT DOCUMENTS 63-159188  1/1990  Japan .
2074505   3/1990  Japan .
2139860   5/1990  Japan .
2139861   5/1990  Japan .

OTHER PUBLICATIONS

"Lithium Insertion Into Manganese Spinels" by M. M. Thackeray et al; Material Research Bulletin, vol. 18, No. 4; 1983; pp. 461–472 no month available.

*Primary Examiner*—Kathryn Gorgos
*Attorney, Agent, or Firm*—Cushman Darby & Cushman, L.L.P.

[57] ABSTRACT

A method for preparing an active substance for positive electrode in non-aqueous electrolytic secondary cells making use of a lithium or lithium alloy negative electrode is described. The method comprises providing an amorphous citrate complex of lithium and a transition metal and firing the complex at a predetermined temperature to obtain an active substance. The citrate complex is obtained by preparing an aqueous mixed solution of lithium hydroxide or carbonate, a water-soluble transition metal salt and citric acid and dehydrating the mixed solution to obtain an amorphous citrate complex. The complex is then fired at a temperature ranging from 300° to 900° C. to obtain an active substance.

15 Claims, 2 Drawing Sheets

METHOD FOR PREPARING AN ACTIVE SUBSTANCE OF LITHIUM SECONDARY CELLS

BACKGROUND OF THE INVENTION

1. Field of the Invention

This invention relates to non-aqueous electrolytic secondary cells and more particularly, to a method for preparing an active substance for positive electrode for use in the cells of the type mentioned above.

2. Description of the Prior Art

Spinel type $LiMn_2O_4$ is known as a positive electrode active substance for non-aqueous electrolytic secondary cells which make use of lithium or lithium alloys as a negative electrode (Material Research Bulletin, 18, (1983) 461–472). For the preparation of $LiMn_2O_4$, there is known a solid phase process wherein various types of lithium salts and manganese salts are mechanically mixed and fired. For instance, Japanese Laid-open Patent Application No. 2-139860 proposes a solid phase process wherein $Li_2O$, $LiOH.H_2O$ or the like and $\gamma MnO_2$ are provided as starting materials, mixed together and heated.

Where the active substance is prepared by firing for 4 to 5 hours according to the known solid phase process, the firing temperature is set at a level as low as not higher than 500° C. By this, the resultant active substance is less degraded but has a reduced capacity. On the contrary, when the firing temperature exceeds 700° C. or over, the resultant active substance has an increased capacity but undergoes a substantial degree of degradation, particularly of initial degradation. Up to now, it has never been attained to obtain an active substance for positive electrode which has a great capacity and a reduced degree of degradation.

The solid phase process makes use of a reaction which depends on diffusion and thus, takes a very long time before the active substance acquires a uniform composition therethroughout. This is considered for the reason why with the firing, within such a short time as set forth above, the compositional variation becomes great resulting in the formation of an active substance which has a reduced capacity and a great degree of initial degradation.

SUMMARY OF THE INVENTION

It is accordingly an object of the invention to provide a method for preparing an active substance which is adapted for use as a positive electrode in non-aqueous electrolytic secondary cells making use of a lithium or lithium alloy negative electrode and which overcomes the problems involved in the prior art processes.

It is another object of the invention to provide a method for preparing an active substance for positive electrode which is obtained by firing within a short time and which has a very high crystallinity, ensuring a great capacity and a reduced degree of degradation.

We have made intensive studies on the preparation of a positive electrode active substance which has a great initial capacity and a small degree of initial degradation, and as a result, found that when an amorphous citrate complex of lithium and a transition metal is fired preferably at a high temperature, the resultant active substance has very high crystallinity with a great capacity on use as a positive electrode and also with a small degree of degradation.

Broadly, the invention contemplates to provide a method for preparing an active substance for positive electrodes in non-aqueous electrolytic secondary cells making use of a lithium or lithium alloy negative electrode which comprises providing an amorphous citrate complex of lithium and a transition metal and firing the complex at a temperature ranging from 300° to 900° C.

DETAILED DESCRIPTION AND EMBODIMENTS OF THE INVENTION

Figure 1:
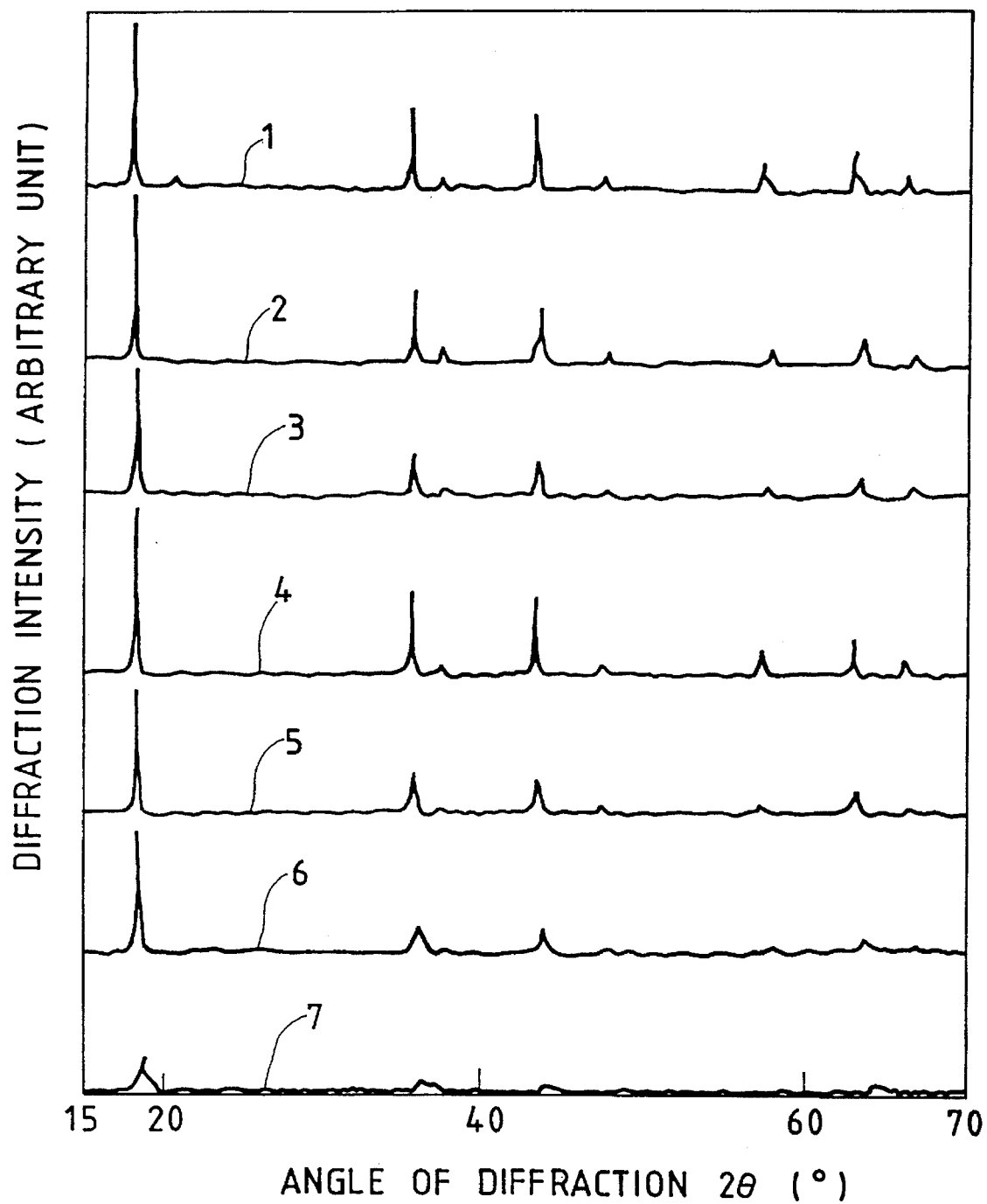
FIG. 1 is a chart showing a diffraction intensity of different types of active substances obtained in Examples 1 to 5 and Comparative Examples 1 and 2.

As defined hereinabove, the method of the invention comprises providing an amorphous citrate complex of lithium and a transition metal and firing the complex at a temperature ranging from 300° to 900° C.

The amorphous citrate complex of lithium and a transition metal can be prepared by a procedure which comprises the steps of preparing a mixed aqueous solution of a water-soluble lithium compound such as lithium hydroxide or carbonate, a water-soluble salt of a transition metal and citric acid and dehydrating the solution to obtain the complex. In this procedure, as set out above, the starting materials include a water-soluble lithium compound such as lithium hydroxide or carbonate, a water-soluble transition metal salt, and citric acid.

Lithium hydroxide usable in the present invention includes LiOH, $LiOH.H_2O$ and the like and is readily soluble in water to provide an aqueous solution. Likewise, hydrous or anhydrous lithium carbonate is readily soluble in water. Preferably, lithium hydroxide is used. The water-soluble salts of transition metals are nitrates, sulfates, hydrochlorides, acetates and the like. Of these, the acetates are preferred. The transition metals in the transition metal salts include, for example, Mn, Co, Cu, Ni and Fe. Specific and preferred examples of the salts include acetates such as $Mn(CH_3COO)_2.4H_2O$, $Co(CH_3COO)_2.4H_2O$, $Cu(CH_3COO)_2.H_2O$, and the like. These salts including the acetates may be used singly or in combination. These salts are also readily soluble in Water to provide an aqueous solution. Citric acid used in the present invention includes, for example, hydrates such as $H_3C_6H_5O_7.H_2O$.

For the preparation of the mixed aqueous solution of lithium hydroxide or carbonate, a transition metal salt and citric acid, these three ingredients are merely mixed together. Although the manner of the preparation is not critical, it is preferred to first mix an aqueous solution of lithium hydroxide or carbonate and an aqueous solution of citric acid, to which an aqueous solution of a transition metal salt is added quickly to obtain a uniform aqueous solution. Alternatively, an aqueous solution of lithium hydroxide or carbonate and an aqueous solution of a transition metal salt may be initially mixed so that there is at least partially formed a hydroxide or carbonate of the transition metal. Subsequently, the mixed solution containing the hydroxide or carbonate of the transition metal is further mixed with an aqueous solution of citric acid to re-dissolve the once formed transition metal hydroxide or carbonate to obtain a titrate complex. Upon the mixing, the mixed solution is agitated well.

The mixing ratio of the metals should correspond to a compositional ratio of the metals in an intended composite oxide serving as an active substance, i.e. the lithium and the transition metal are mixed at a ratio corresponding to an atomic ratio of these metals in an intended composite oxide serving as an active substance.

The trivalent citric acid should be present in an amount by equivalent equal to the total equivalents of the metal ions in the water-soluble lithium compound and the transition metal salt. For instance, in order to obtain $LiMn_2O_4$, mixing ratios by mole of $LiOH.H_2O$, $Mn(CH_3COO)_2.H_2O$ and $H_3C_6H_5O_7.H_2O$ are 3:6:5.

For the preparation of the mixed aqueous solution, the mixing should preferably be effected at a temperature not higher than 40° C. under agitation. The thus obtained mixed aqueous solution is immediately subjected to dehydration.

In the dehydration step for gelation, the mixed aqueous solution is heated at a temperature of from 100° C. to lower than 150° C. under reduced pressure to obtain a gel, and the thus obtained gel is dried to obtain an amorphous citrate complex. In this step, the mixed aqueous solution is dehydrated quickly at the defined temperature. This is because when the dehydration is effected at temperatures lower than 100° C., a crystalline phase is undesirably apt to segregate. Over 150° C., part of the complex starts to decompose, and it is thus preferred to dehydrate at lower temperatures under reduced pressure although higher temperatures may be used in an atmosphere containing oxygen molecules. It is preferred that the dehydration is effected at a reduced pressure of not higher than 5000 Pa. The agitation of the aqueous solution during the course of the heating is liable to cause segregation and is not favorable.

In this step, an amorphous citrate complex is obtained.

The acid, e.g. acetic acid, and water released during the course of the step are dissipated by evaporation. As stated above, the dehydration step is preferably carried out under a reduced pressure as defined above at a temperature not higher-than 150° C. It will be noted herein that the mixed solution obtained after the mixing step should preferably be subjected to dehydration as soon as possible. If the mixture is allowed to stand for 2 to 3 hours, an intended composite oxide may not be obtained at a high yield.

The X-ray diffraction analysis of the thus obtained amorphous citrate complex reveals that any specific peak does not appear.

The citrate complex is then subjected to a firing step wherein it is fired at a temperature of 300° to 900° C., preferably 700° to 900° C. In this step, the decomposed product of citric acid is burnt to generate gases. Accordingly, it is preferred that a reactor furnace is forcibly exhausted to invariably introduce fresh air thereinto.

The firing temperature should preferably be higher within a range where the resultant active substance is not decomposed. For instance, with $LiMn_2O_4$, the composite oxide commences to be produced at approximately 250° C. but thermal decomposition does not proceed satisfactorily and crystal growth becomes unsatisfactory. The resultant composite oxide has a good resistance to degradation but has not a great capacity. When the firing temperature is in the range of 300° to 900° C., preferably 700° to 900° C., the crystals grow well as having a good resistance to degradation and a great capacity.

In the firing step, lithium and the transition metal are reacted with each other to provide a composite oxide such as, for example, $LiMn_2O_4$. As stated hereinbefore, the composite oxide starts to be formed at a temperature of approximately 250° C. Such a composite oxide is not satisfactory with respect to its crystallinity, with a reduced electric capacity. The composite oxide obtained by firing at a temperature of 300° to 900° C. has a good electric capacity and a good resistance to degradation with the high electric capacity being maintained over a long time. Over 900° C., part of the composite oxide active substance is partly decomposed into metal oxides with a lower valence.

In the most preferred embodiment of the invention, the transition metal used should consist of manganese (Mn) and the active substance should consist of spinel type $LiMn_2O_4$ in view of the characteristic properties thereof. In this case, Li may be partly replaced by Cu, so that the resultant active substance consists of a Cu-substituted product based on the spinel type $LiMn_2O_4$. This Cu-substituted product may be represented by the formula, $Li_{1-x}Cu_xMn_2O_4$, wherein x is in the range of 0.02 to 0.2.

The active substance obtained according to the method of the invention has a great electric capacity and a good resistance to degradation. The reason for this is not clearly understood at the present stage of out investigation. We assume that lithium and a transition metal are uniformly dispersed in the amorphous citrate complex at the commencement of the firing step and that a composite oxide active substance is directly formed at the time of thermal decomposition without formation of any intermediate product. Accordingly, any segregation does not take place during the thermal decomposition and any solid phase reaction does not proceed throughout the preparation steps thereby providing an active substance of high crystallinity. This will bring about a good electric capacity and a good resistance to degradation.

The lithium secondary cell using the active substance for positive electrode also has a great electric capacity and a good resistance to degradation.

The present invention is described by way of examples.

EXAMPLE 1

Components $LiOH.H_2O$, $Mn(CH_3COO)_2.4H_2O$ and $H_3C_6H_5O_7.H_2O$ were provided as starting materials for positive electrode active substance. These $LiOH.H_2O$, $Mn(CH_3COO)_2.4H_2O$ and $H_3C_6H_5O_7.H_2O$ starting materials were, respectively, weighed at molar ratios of 3:6:5 and each dissolved in de-ionized water to obtain an aqueous lithium hydroxide, an aqueous manganese acetate solution and an aqueous citric acid solution having concentrations of 0.50 moles/liter, 1.000 mole/liter and 0.834 moles/liter, respectively. One liter of the aqueous lithium hydroxide solution and 1 liter of the aqueous citric acid solution were mixed while agitating well, followed by further mixing of 1 liter of the aqueous manganese acetate solution while agitating well to obtain a light red mixed aqueous solution.

Thereafter, the aqueous solution was heated at 120° C. under a reduced pressure of approximately 3000 Pa., and dehydrated for gelation, followed by continuing the heating to obtain a citrate complex.

The citrate complex was scraped off from a container and was roughly milled, followed by firing at 800° C. in air for 4 hours to obtain a puff-shaped active substance.

EXAMPLE 2

Components $LiOH.H_2O$, $Cu(CH_3COO)_2.H_2O$, $Mn(CH_3COO)_2.4H_2O$ and $H_3C_6H_5O_7.H_2O$ were provided as starting materials for positive electrode active substance. These $LiOH.H_2O$, $Cu(CH_3COO)_2.H_2O$, $Mn(CH_3COO)_2.4H_2O$ and $H_3C_6H_5O_7.H_2O$ starting materials were, respectively, weighted at molar ratios of 2.85:0.15:6:5 and each dissolved in de-ionized water to obtain an aqueous lithium hydroxide, an aqueous copper acetate solution, an aqueous manganese acetate solution and an aqueous citric acid solution having concentrations of 0.475 moles/liter, 0.025 moles/liter, 1.000 mole/liter and 0.834 moles/liter, respectively.

One liter of the aqueous lithium hydroxide solution and 1 liter of the aqueous citric acid aqueous solution were mixed under sufficient agitation, followed by further mixing of 1 liter of the aqueous manganese acetate solution and 1 liter of the aqueous copper acetate solution under sufficient agitation to obtain a blue mixed aqueous solution.

Then, the general procedure of Example 1 was repeated to obtain an active substance.

EXAMPLE 3

The general procedure of Example 1 was repeated except that the citrate complex obtained in Example 1 was fired at 350° C., thereby obtaining an active substance.

EXAMPLE 4

Components $LiOH.H_2O$, $Mn(CH_3COO)_2.4H_2O$ and $H_3C_6H_5O_7.H_2O$ were provided as starting materials for positive electrode active substance. These $LiOH.H_2O$, $Mn(CH_3COO)_2.4H_2O$ and $H_3C_6H_5O_7.H_2O$ starting materials were, respectively, weighed at molar ratios of 3:6:5 and each dissolved in de-ionized water to obtain an aqueous lithium hydroxide, an aqueous manganese acetate solution and an aqueous citric acid solution having concentrations of 0.50 moles/liter, 1.000 mole/liter and 0.834 moles/liter, respectively.

One liter of the aqueous Mn acetate solution was added to 1 liter of the aqueous lithium hydroxide solution under sufficient agitation to obtain a mixed solution having a precipitate considered as manganese hydroxide. One liter of the citric acid solution were then added to the mixture so that the precipitate was completely re-dissolved.

Thereafter, the mixed solution was dehydrated to dryness under reduced pressure at 120° C. to obtain a citrate complex gel.

The complex gel was fired in air at 800° C. for 4 hours to obtain a puff-shaped active substance.

EXAMPLE 5

The general procedure of Example 4 repeated except that the citrate complex obtained in Example 4 was fired at 350° C., thereby obtaining an active substance.

Comparative Example 1

Components $LiOH.H_2O$ and EMD (electrolytic manganese dioxide) were weighed at a molar ratio of Li and Mn of 1:2 and sufficiently mixed in a mortar, followed by firing in air at 800° C. for 4 hours, thereby obtaining an active substance.

Comparative Example 2

The general procedure of Comparative Example 1 was repeated except that the firing temperature was set at 500° C.

Evaluation of Crystalline Structure and Crystallinity The active substances obtained in the examples and comparative examples were each subjected to X-ray diffraction analyses to evaluate the crystalline structure and crystallinity. To this end, a Cu-Kα was used as an X-ray source and the measuring conditions included a tube potential of 40 kV, a tube current of 20 mA, a canning speed of 2°/minute, a diverging slit width of 0.5°, and an acceptance slit width of 0.15°.

The relation between the diffraction intensity and the diffraction angle, 2θ, of the respective active substances obtained in Examples 1 to 5 and Comparative Examples 1, 2 are shown in FIG. 1. In the figure, reference numerals 1 to 5, respectively, correspond to the active substances obtained in Examples 1 to 5 and reference numerals 6, 7, respectively, correspond to the active substances of Comparative Examples 1, 2.

Fabrication of Lithium Secondary Cells

The respective active substances of the examples and the comparative examples were used to four button-shaped test cells for each active substance. A positive electrode was made by mixing 90 wt % of each active substance, 6 wt % of Ketjen black serving as a conductive agent, and 4 wt % of a tetrapolyethylenefluoroethylene binder. An amount of 50 mg of the resultant mixture was weighed and pressed molded on a stainless steel mesh current collector with a diameter of 14 mm at a compression pressure of 3 tons/cm$^2$ to provide a positive electrode. A negative electrode was made of metallic lithium directly pressed against a casing. A liquid electrolyte used was a solution of 1 M of lithium perchlorate ($LiClO_4$) dissolved in a mixed solution of equal amounts of propylene carbonate (PC) and 1,2-dimethoxyethane (DME). A separator was made of a polypropylene non-woven fabric sheet.

The four test cells for each active substance were, respectively, charged for 5 hours under limited conditions of a maximum current density of 2 mA/cm$^2$ and a maximum voltage of 4.1 V, followed by constant potential discharge to 2 V at a maximum current density of 2 mA/cm$^2$ and repetition of the charge and discharge cycles.

Figure 2:
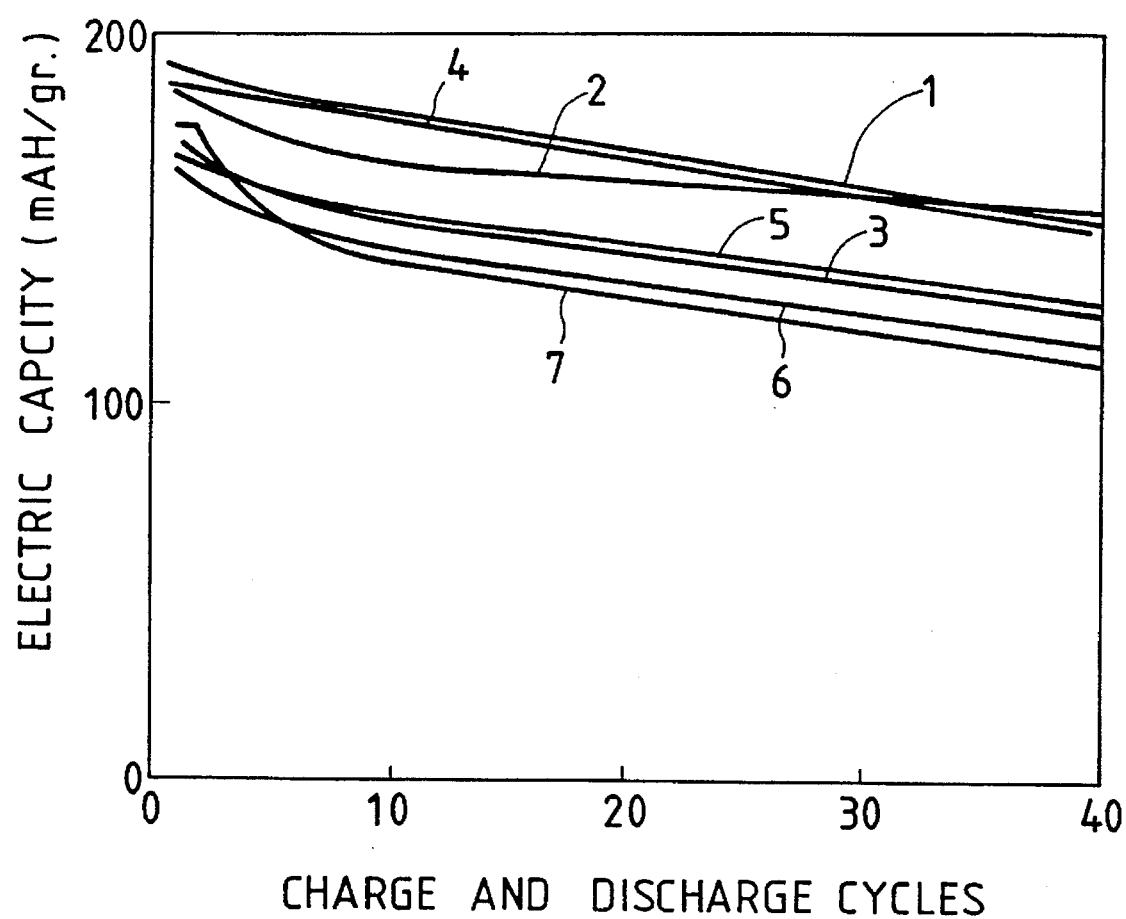
FIG. 2 is a graphical representation of the capacity in relation to the variation of the charge and discharge cycles of lithium secondary cells using the active substances obtained in Examples 1 to 5 and Comparative Examples 1 and 2, respectively.

The relation between the capacity and the charge and discharge cycles for the respective cells is shown in FIG. 2 wherein reference numerals 1 to 5, respectively, indicate cells using the active substances obtained in Examples 1 to 5 and reference numerals 6, 7 indicate cells using the active substances obtained in Comparative Examples 6, 7, respectively.

As will be apparent from FIG. 2, the electric capacities of the lithium secondary cells using the active electrode active substances of Examples 1, 2 and 4 are initially greater than 180 mAH/gr. per positive electrode. After the 40th cycle, the capacity is kept at a level as great as approximately 150 mAH/gr. in all the cases. With the lithium secondary cells using the active substances of Examples 3 and 5, the initial degradation is small but the initial capacity is so small as approximately 165 mAH/gr.

The cell using the active substance of Comparative Example 1 has an initial capacity as great as about 180 mAH/gr., but its initial degradation is considerable, i.e. the capacity lowers to about 150 mAH/gr. at the 10th cycle and to about 110 mAH/gr. at the 40th cycle. The cell using the active substance of Comparative Example 2 suffers a relatively smaller degree of initial degradation but its initial capacity is as low as 160 mAH/gr.

In view of the above results, the cells using the active substances of Examples 1, 2 and 4 are pronouncedly high in capacity with a very reduced degree of degradation.

From FIGS. 1 and 2, it will be seen that the active substances which have a higher initial capacity are higher in the diffraction intensity. From this, it is considered that the improvement in the electric capacity ascribes to the substantial increasing amount of an active substance whose crystals grow well. The reason why the degradation is suppressed is difficult to explain. In view of the fact that with the active substances prepared according to known procedures, those which have a greater initial capacity are more liable to degrade whereas the active substance prepared according to the method of the invention, which has a great capacity, is unlikely to undergo degradation, it is assumed that the unlikelihood results from the very high crystallinity thereof.

What is claimed is:

1. A method for preparing an active substance for use in a positive electrode in a non-aqueous electrolytic secondary cell containing a lithium or lithium alloy negative electrode, the method of making the active substance comprising the steps of:

providing an amorphous citrate complex comprising lithium and a transition metal; and firing the complex at a temperature ranging from 300° to 900° C. to obtain the active substance.

2. A method according to claim 1, wherein said amorphous citrate complex comprises a dehydrated mixture of a water-soluble compound selected from the group consisting of lithium hydroxide and lithium carbonate, a water-soluble salt of a transition metal and a citric acid.

3. A method according to claim 2, wherein said lithium compound consists of lithium hydroxide.

4. A method according to claim 2, wherein said water-soluble salt consists of an acetate.

5. A method according to claim 2, wherein a mixed aqueous solution is prepared by first mixing an aqueous solution of said lithium hydroxide or lithium carbonate and an aqueous citric acid solution, and then further mixing an aqueous solution of said water-soluble salt with the resultant mixture and dehydrating said resultant mixture to obtain said amorphous citrate complex.

6. A method according to claim 5, wherein said water-soluble salt consists of manganese acetate.

7. A method according to claim 5, wherein said lithium compound, said water-soluble salt and said citric acid are so mixed that said citric acid is present in an amount by equivalent equal to the total equivalents of the metal ions in the lithium compound and the transition metal salt.

8. A method according to claim 5, wherein said mixed aqueous solution is prepared by sufficient mixing at a temperature not higher than 40° C. and is immediately subjected to dehydration.

9. A method according to claim 5, wherein said mixed aqueous solution is dehydrated by heating at a temperature of from 100° C. to lower than 150° C. under reduced pressure to obtain a gel and drying the gel to obtain an amorphous citrate complex.

10. A method according to claim 9, wherein the dehydration is effected at a reduced pressure of not higher than 5000 Pa.

11. A method according to claim 1, wherein said transition metal consists of manganese and said active substance consists of spinel type $LiMn_2O_4$.

12. A method according to claim 1, wherein said active substance consists of spinel type, $Li_{1-x}Cu_xMn_2O_4$, wherein x is in the range of from 0.02 to 0.2.

13. A method according to claim 1, wherein the firing is effected at a temperature ranging from 700° to 900° C.

14. An active substance obtained by the method of claim 1.

15. A method for preparing an active substance for use in a positive electrode in a non-aqueous electrolytic secondary cell containing a lithium or lithium alloy negative electrode, the method of making the active substance comprising the steps of:

preparing a mixed aqueous solution comprising a water-soluble salt selected from the group consisting of lithium hydroxide and lithium carbonate, a transition metal acetate and citric acid;

dehydrating the mixed aqueous solution to obtain a citrate complex; and firing said citrate complex at a temperature ranging from 300° to 900° C. to obtain a composite oxide of the lithium and the transition metal.

* * * * *